United States Patent
Wildermuth

(10) Patent No.: US 9,400,817 B2
(45) Date of Patent: Jul. 26, 2016

(54) IN-PLACE INDEX REPAIR

(71) Applicant: Elton Wildermuth, Oakland, CA (US)

(72) Inventor: Elton Wildermuth, Oakland, CA (US)

(73) Assignee: SYBASE, INC., Dublin, CA (US)

( * ) Notice: Subject to any disclaimer, the term of this patent is extended or adjusted under 35 U.S.C. 154(b) by 254 days.

(21) Appl. No.: 14/145,618

(22) Filed: Dec. 31, 2013

(65) Prior Publication Data

US 2015/0186442 A1 Jul. 2, 2015

(51) Int. Cl.
 *G06F 17/30* (2006.01)

(52) U.S. Cl.
 CPC .... *G06F 17/30336* (2013.01); *G06F 17/30321* (2013.01)

(58) Field of Classification Search
 CPC .................... G06F 17/30336; G06F 17/30371; G06F 17/30321
 USPC .......................................................... 707/696
 See application file for complete search history.

(56) References Cited

U.S. PATENT DOCUMENTS

| | | | | |
|---|---|---|---|---|
| 5,222,235 A * | 6/1993 | Hintz | ................ | G06F 17/30312 |
| 5,404,510 A * | 4/1995 | Smith | ................ | G06F 17/30598 |
| 5,519,831 A * | 5/1996 | Holzhammer | ...... | G06F 11/1441 365/228 |
| 5,822,748 A * | 10/1998 | Cohen | ................ | G06F 17/30454 |
| 5,960,194 A | 9/1999 | Choy et al. | | |
| 6,233,583 B1 * | 5/2001 | Hoth | ................. | G06F 17/30398 707/752 |
| 6,438,562 B1 * | 8/2002 | Gupta | ................ | G06F 17/30336 707/696 |
| 6,457,014 B1 * | 9/2002 | Parker | ................ | G06F 17/30336 |
| 6,591,269 B1 | 7/2003 | Ponnekanti | | |
| 6,879,986 B1 * | 4/2005 | Fisher | ................ | G06F 17/30339 |
| 7,340,454 B2 | 3/2008 | Wu et al. | | |
| 7,386,563 B1 * | 6/2008 | Pal | ................... | G06F 17/30336 |
| 7,406,477 B2 | 7/2008 | Farrar et al. | | |
| 7,603,336 B2 * | 10/2009 | Cotner | .............. | G06F 17/30339 |
| 7,650,354 B2 * | 1/2010 | Takahashi | ......... | G06F 17/30336 707/999.101 |
| 8,051,045 B2 * | 11/2011 | Vogler | .............. | G06F 17/30312 707/661 |
| 8,161,015 B2 | 4/2012 | Kennedy et al. | | |
| 8,161,017 B2 | 4/2012 | Hrle et al. | | |
| 8,200,633 B2 * | 6/2012 | Bendakovsky | ..... | G06F 11/1458 707/640 |
| 8,200,673 B2 | 6/2012 | Hanson et al. | | |
| 8,224,829 B2 | 7/2012 | Pauly | | |
| 8,244,700 B2 | 8/2012 | Permandla et al. | | |
| 8,260,769 B1 * | 9/2012 | Fuller | ............... | G06F 17/30457 707/713 |
| 8,296,276 B2 | 10/2012 | Novak et al. | | |

(Continued)

OTHER PUBLICATIONS

Bohannon et al., "Main-Memory Index Structures with Fixed-Size Partial Keys", In Proceedings of the 2001 ACM SIGMOD International Conference on Management of Data (SIGMOD '01), pp. 163-174, 2001.*

(Continued)

*Primary Examiner* — Phoung Thao Cao
(74) *Attorney, Agent, or Firm* — Sterne, Kessler, Goldstein & Fox P.L.L.C.

(57) ABSTRACT

Disclosed herein are system, method, and computer program product embodiments for sorting a disarranged index keys in an index. First an operation is performed on a table that includes an index set on at least one column, where the operation causes the index keys in the index to become disarranged. The disarranged index keys are rearranged into a proper order using an in-place index sort. To rearrange the index keys in the index, a determination is made whether the index is a tail-end index and whether the index is a fixed-size index. Based on the determination, the in-place index sort is performed on the index, where the in-place index sort arranges the index keys in the index into the proper order.

20 Claims, 7 Drawing Sheets

(56) References Cited

U.S. PATENT DOCUMENTS

| | | | | |
|---|---|---|---|---|
| 8,321,799 | B1* | 11/2012 | Simonson | G06F 3/0482 715/764 |
| 8,335,776 | B2 | 12/2012 | Gokhale | |
| 8,510,269 | B2* | 8/2013 | Witt | G06F 17/30321 707/635 |
| 8,589,406 | B2 | 11/2013 | Lillibridge | |
| 8,719,254 | B2* | 5/2014 | Yang | G06F 17/30312 707/715 |
| 9,298,387 | B2* | 3/2016 | Chauvet | G06F 17/30303 |
| 2003/0056082 | A1* | 3/2003 | Maxfield | G06F 17/30595 712/4 |
| 2003/0135495 | A1* | 7/2003 | Vagnozzi | G06F 17/30324 |
| 2003/0204513 | A1* | 10/2003 | Bumbulis | G06F 17/30327 |
| 2004/0122842 | A1* | 6/2004 | Friske | G06F 17/30368 |
| 2004/0133927 | A1* | 7/2004 | Sternberg | G06F 17/30247 725/136 |
| 2004/0148293 | A1* | 7/2004 | Croisettier | G06F 17/30336 |
| 2004/0215632 | A1* | 10/2004 | Isip | G06F 17/3061 |
| 2005/0187990 | A1* | 8/2005 | Pace | G06F 17/30067 |
| 2005/0246612 | A1* | 11/2005 | Leis | G06F 11/0727 714/763 |
| 2005/0278394 | A1* | 12/2005 | Oks | G06F 11/1402 |
| 2006/0047719 | A1* | 3/2006 | Hershkovich | G06F 17/30336 |
| 2006/0143238 | A1* | 6/2006 | Tamatsu | G06F 17/30336 |
| 2006/0173938 | A1* | 8/2006 | Banzon | G06F 9/5066 |
| 2006/0212496 | A1* | 9/2006 | Romine | G06F 17/30604 |
| 2007/0061546 | A1* | 3/2007 | Berger | H03M 7/30 711/202 |
| 2007/0118547 | A1* | 5/2007 | Gupta | G06F 17/30336 |
| 2008/0065590 | A1* | 3/2008 | Castro | G06F 17/30463 |
| 2008/0086470 | A1* | 4/2008 | Graefe | G06F 17/30362 |
| 2008/0104102 | A1* | 5/2008 | Zhang | G06F 17/30336 |
| 2009/0063400 | A1* | 3/2009 | Borkar | G06F 17/30911 |
| 2010/0161569 | A1 | 6/2010 | Schreter | |
| 2010/0169665 | A1* | 7/2010 | Kang | G06F 17/30321 713/189 |
| 2010/0281005 | A1* | 11/2010 | Carlin | G06F 17/30312 707/696 |
| 2010/0287193 | A1* | 11/2010 | Shinjo | G06F 17/30625 707/769 |
| 2011/0035359 | A1* | 2/2011 | Bendakovsky | G06F 11/1458 707/640 |
| 2011/0213775 | A1* | 9/2011 | Franke | G06F 17/30584 707/737 |
| 2011/0264377 | A1* | 10/2011 | Cleary | G06F 19/22 702/19 |
| 2012/0096389 | A1* | 4/2012 | Flam | G06F 17/3089 715/777 |
| 2012/0323923 | A1* | 12/2012 | Duan | G06F 17/30486 707/741 |
| 2013/0091112 | A1* | 4/2013 | Iyer | G06F 17/30345 707/702 |
| 2013/0232152 | A1* | 9/2013 | Dhuse | G06F 17/30321 707/741 |
| 2014/0143260 | A1* | 5/2014 | Simonson | G06F 17/245 707/752 |
| 2014/0379727 | A1* | 12/2014 | Shimono | G06F 17/30741 707/741 |
| 2015/0026137 | A1* | 1/2015 | Chauvet | G06F 17/30303 707/692 |
| 2015/0032684 | A1* | 1/2015 | Gupta | G06F 17/30575 707/600 |
| 2015/0032758 | A1* | 1/2015 | Schneider | G06F 17/30336 707/741 |
| 2015/0066900 | A1* | 3/2015 | Schneider | G06F 17/30445 707/718 |
| 2015/0186442 | A1* | 7/2015 | Wildermuth | G06F 17/30336 707/696 |

OTHER PUBLICATIONS

Winand, M., "Concatenated Indexes", dated Nov. 15, 2011, 8 pages, accessed online at <http://use-the-index-luke.com/sql/where-clause/the-equals-operator/concatenated-keys> on Nov. 2, 2015.*

* cited by examiner

| | C1 | C2 | C3 |
|---|---|---|---|
| | ⋮ | ⋮ | ⋮ |
| R1 | 1 | a | 1 |
| R2 | 1 | a | 1 |
| R3 | 1 | a | 2 |
| R4 | 1 | b | 1 |
| R5 | 1 | b | 2 |
| | ⋮ | ⋮ | ⋮ |

IN-PLACE INDEX REPAIR

BACKGROUND

To conserve space and avoid fragmentation, database systems typically perform database compaction. In the database compaction, tables stored in a given location in the database are copied to another location. After the copying, indices on one or more columns in the database table may become corrupted. One conventional way to correct a corrupted index is to delete and recreate the index on the indexed columns. This operation however, is expensive both in terms of space usage and processing time.

BRIEF DESCRIPTION OF THE DRAWINGS

The accompanying drawings are incorporated herein and form a part of the specification.

FIG. 5 is a block diagram of an index table on which an in-place index sort is implemented, according to an embodiment.

In the drawings, like reference numbers generally indicate identical or similar elements. Additionally, generally, the left-most digit(s) of a reference number identifies the drawing in which the reference number first appears.

DETAILED DESCRIPTION

Provided herein are system, method and/or computer program product embodiments, and/or combinations and sub-combinations thereof, for.

Figure 1:
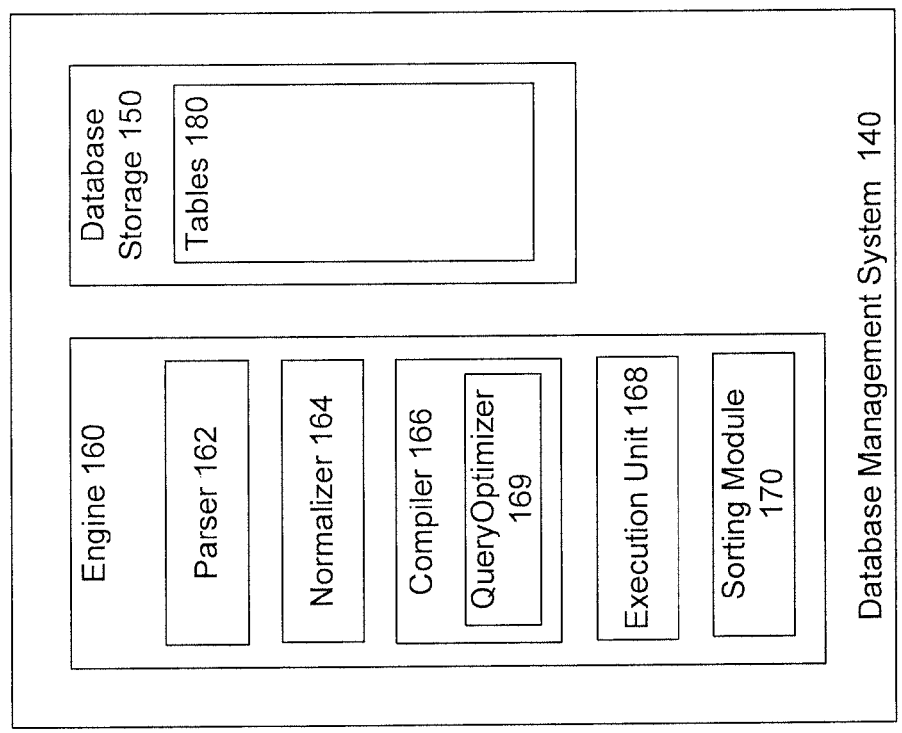
FIG. 1 is an example database computing environment in which various embodiments can be implemented.
Figure 1:
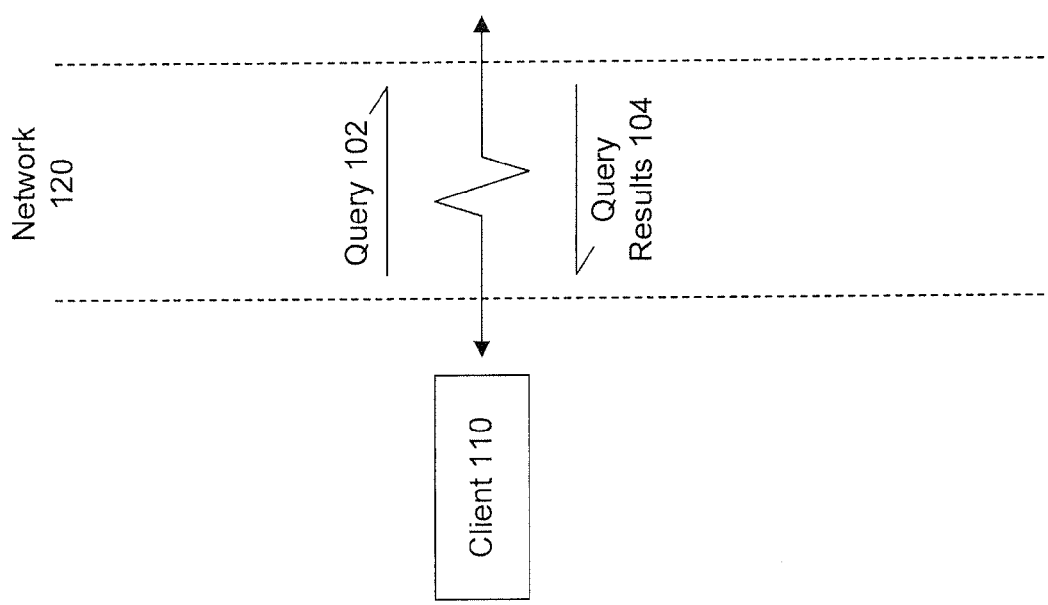

FIG. 1 is an example database computing environment 100 in which embodiments can be implemented. A client 110 communicates with a database management system ("DBMS"), such as DBMS 140. Although client 110 is represented in FIG. 1 as a separate physical machine from DBMS 140, this is presented by way of example, and not limitation. In an additional embodiment, client 110 occupies the same physical system as DBMS 140. In a further embodiment, client 110 is a software application that has access to DBMS 140. In another embodiment, a user operates client 110 to request access to DBMS 140.

Client 110 and DBMS 140 may communicate over network 120, though the implementation is not limited to this embodiment. Network 120 may be any network or combination of networks that can carry data communications. Such a network 120 may include, but is not limited to, a local area network, metropolitan area network, and/or wide area network such as the Internet. In another embodiment, client 110 communicates with DBMS 140 without involving a network 120.

DBMS 140 receives a query, such as query 102, from client 110. Query 102 is used to request, modify, append, and/or otherwise manipulate or access data in database storage 150. Query 102 is transmitted to DBMS 140 by client 110 using syntax which conforms to a query language. In a non-limiting embodiment, the query language is a Structured Query Language ("SQL"), but may be another query language. DBMS 140 is able to interpret query 102 in accordance with the query language and, based on the interpretation, generate requests to database storage 150.

Query 102 may be generated by a user using client 110 or by an application executing on client 110. Upon receipt, DBMS 140 begins to process query 102. Once processed, the result of the processed query is transmitted to client 110 as query result 104.

To process query 102, DBMS 140 includes a parser 162, a normalizer 164, a compiler 166, and an execution unit 168.

Parser 162 parses queries 102. In an embodiment, parser 162 converts query 102 into a binary tree data structure which represents the format of query 102. In other embodiments, other types of data structures are used.

When parsing is complete, parser 162 passes the parsed query to a normalizer 164. Normalizer 164 normalizes the parsed query. For example, normalizer 164 eliminates redundant data from the parsed query. Normalizer 164 also performs error checking on the parsed query that confirms that the names of the tables in the parsed query conform to the names of tables 180. Normalizer 164 also confirms that relationships among tables 180, as described by the parsed query, are valid.

Once normalization is complete, normalizer 164 passes the normalized query to compiler 166. Compiler 166 compiles the normalized query into machine-readable format. The compilation process determines how query 102 is executed by DBMS 140. To ensure that query 102 is executed efficiently, compiler 166 uses a query optimizer 169 to generate an access plan for executing the query.

Query optimizer 169 determines an access plan for executing the query. The access plan is a set of instructions that, when executed by DBMS 140, retrieve and manipulate information in the database storage 150 in accordance with the query semantics. This may include choosing the access method for each table accessed, choosing the order in which to perform a join operation on the tables, and choosing the join method to be used in each join operation. As there may be multiple strategies for executing a given query using combinations of these operations, query optimizer 169 generates and evaluates a number of strategies from which to select the best strategy to execute the query.

To generate an access plan, query optimizer 169 divides a query 102 into multiple subsets. Each subset may be part of a larger set that is a union of multiple subsets or be subdivided into other subsets. Query optimizer 169 then determines an access plan for each subset. Once the access plan for each subset is determined, query optimizer 169 combines the access plan for each subset to generate a best or optimal access plan for the query 102.

Notably, the embodiments are not limited to the system discussed above, but can be implemented in a standalone environment operable on mobile devices, such as smartphones, tables, laptops, desktops, and other computing devices that host a database system.

In an embodiment, database storage 150 stores database tables 180. Tables 180 store data accessed using multiple applications. In an embodiment, tables 180 are stored in a collection of logical pages, each of a fixed size. Each logical page corresponds to one or more physical pages. Physical pages correspond to a physical location of one of memories described in FIG. 7.

In an embodiment, table 180 also includes an index or multiple indexes on one or more columns. An index is a data structure that improves data retrieval speed in table 180. An index allows DBMS 140 to quickly locate data without having to search every row in a database table, such as table 180. For this purpose, an index includes a copy of data in the indexed columns. Each row of copied data may be referenced using an index key. An index may also include an index pointer to a complete row of table 180 in location from where the indexed data referenced using the index key was copied.

In an embodiment, DBMS 140 performs a database compaction operation. Database compaction corrects fragmentation that occurs from multiple accesses and updates to table 180 by keeping the table 180 in, for example, consecutive physical pages. Database compaction increases available space in database storage 150. In an embodiment, the database compaction operation copies data in table 180 from one location in physical storage to another location in physical storage.

However, when data in table 180 is copied to another location, a DBMS 140 cannot guarantee that the index on the duplicate data will be maintained in a proper order. This is the case because DBMS 140 does not guarantee which physical page will receive the copied data. To maintain a proper index on table 180, DBMS 140 includes a sorting module 170. Sorting module 170 performs an in-place index sort on table 180 after database compaction as described in FIGS. 2-4. An in-place index sort sorts rows in the indexed columns in table 180 after database compaction and without deleting or recreating the index. For example, once table 180 is copied to another physical location, the index keys in the index associated with duplicate values in the same indexed column may become scrambled. The in-place index sort unscrambles the index without deleting and recreating the index on the indexed columns.

Figure 2:
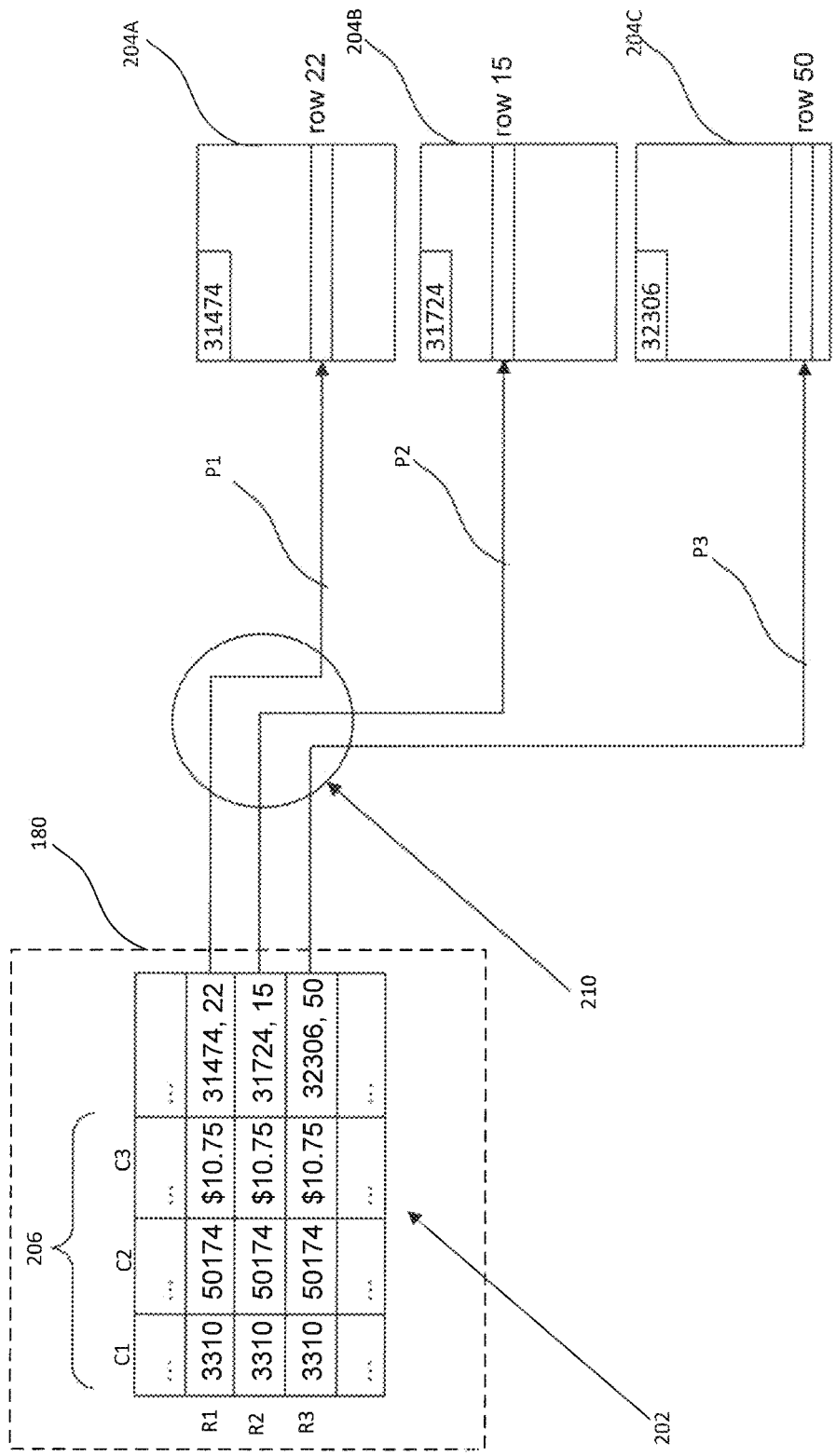
FIG. 2 is a block diagram of an indexed table before copying, according to an embodiment.

FIG. 2 is a block diagram 200 of an indexed table before copying, according to an embodiment. Block diagram 200 includes an example table 180 that stores data in columns C1, C2, and C3 and rows R1, R2, R3, etc. For example, the data may include values such as "3310" for a subset of rows in C1, "50174" for a subset of rows in C2, and "$10.75" for a subset of rows in C3. The data is stored in a logical page 202 and physical pages 204A-C. Logical page 202 shows how the data is stored in order in columns C1, C2, and C3, whereas physical pages 204A-C are actual pages that store the data. Rows of data in table 180 stored in physical pages 204A-C need not be in consecutive order.

In an embodiment, in FIG. 2, index 206 is set on columns C1, C2, and C3 in table 180. Each row in index 206 includes index keys. Index keys map to particular rows in physical pages 204A-C that store data in indexed columns C1, C2, and C3. Exemplary index keys in table 180 include keys K1, K2, and K3 (not shown). Key K1 accesses data in row R1 for columns C1, C2, and C3. Key K2 accesses data in row R2 for columns C1, C2, and C3. Key K3 accesses data in row R3 for columns C1, C2, and C3.

In an embodiment, an index key may also point to a location in physical page 204 that stores an entire row from table 180 that is associated with the index key. Index pointers 210 are pointers of index keys that point to physical pages 204A-C that store the entire row from table 180 associated with the index keys. For example, index pointers 210 include pointer P1 that points to physical page 204A and row that stores data for K1, such as, physical page 204A having page ID=31474, row=22; pointer P2 that points to physical page 204B and row that stores data for K2, such as, physical page 204B having page ID=31724, row=15; and pointer P3 that points to physical page 204C and row that stores data for K3, such as physical page 204C having page ID 32306, row=50.

In an embodiment, since the values in the indexed columns are components in associating index pointer 210 to a physical location of data in physical pages 204A-C, the data in columns on which the index 206 is set is unique. Data is unique when none of the index keys point to columns that store the same set of data.

In another embodiment, a unique index is built on columns where data is duplicative, and not unique. For example, rows R1, R2, and R3 in table 180 have the same values in each of columns C1, C2, and C3. To ensure that index 206 is unique and to disambiguate entries in rows R1, R2, and R3, the index key also includes a location of data in logical page 202 as part of mapping the index key to a location on physical page 204. For example, in addition to logical page ID, logical page 202 also includes a row ID, or RID. In an embodiment, a RID of rows R1, R2, and R3 is a component of an index key and index pointer 210. The RID is a tie breaker in index 206 that includes duplicate index keys. Because a RID is different for each row in logical page 202 and for every logical page 202, each index key points to a different location in physical page 204 using index pointers 210.

In an embodiment, multiple tables 180 in database storage 150 are manipulated by different applications executing on client 110. This manipulation results in inefficient data storage in database storage 150, where, for example, tables 180 are fragmented and are stored in non-contiguous physical storage. For example, the more rows are inserted or deleted into and from table 180 the more fragmented table 180 becomes. To remove fragmentation and free up space in database storage 150, DBMS 140 may perform database compaction. Database compaction reduces and/or removes sections of unused pages and frees space. One of the ways to reduce or remove pages is to copy tables 180 from these pages and place them elsewhere in database storage 150. To copy tables 180, DMBS 140 allocates space in physical pages 204 elsewhere in database storage 150 and copies tables 180 into contiguous potions of allocated physical pages 204.

Figure 3:
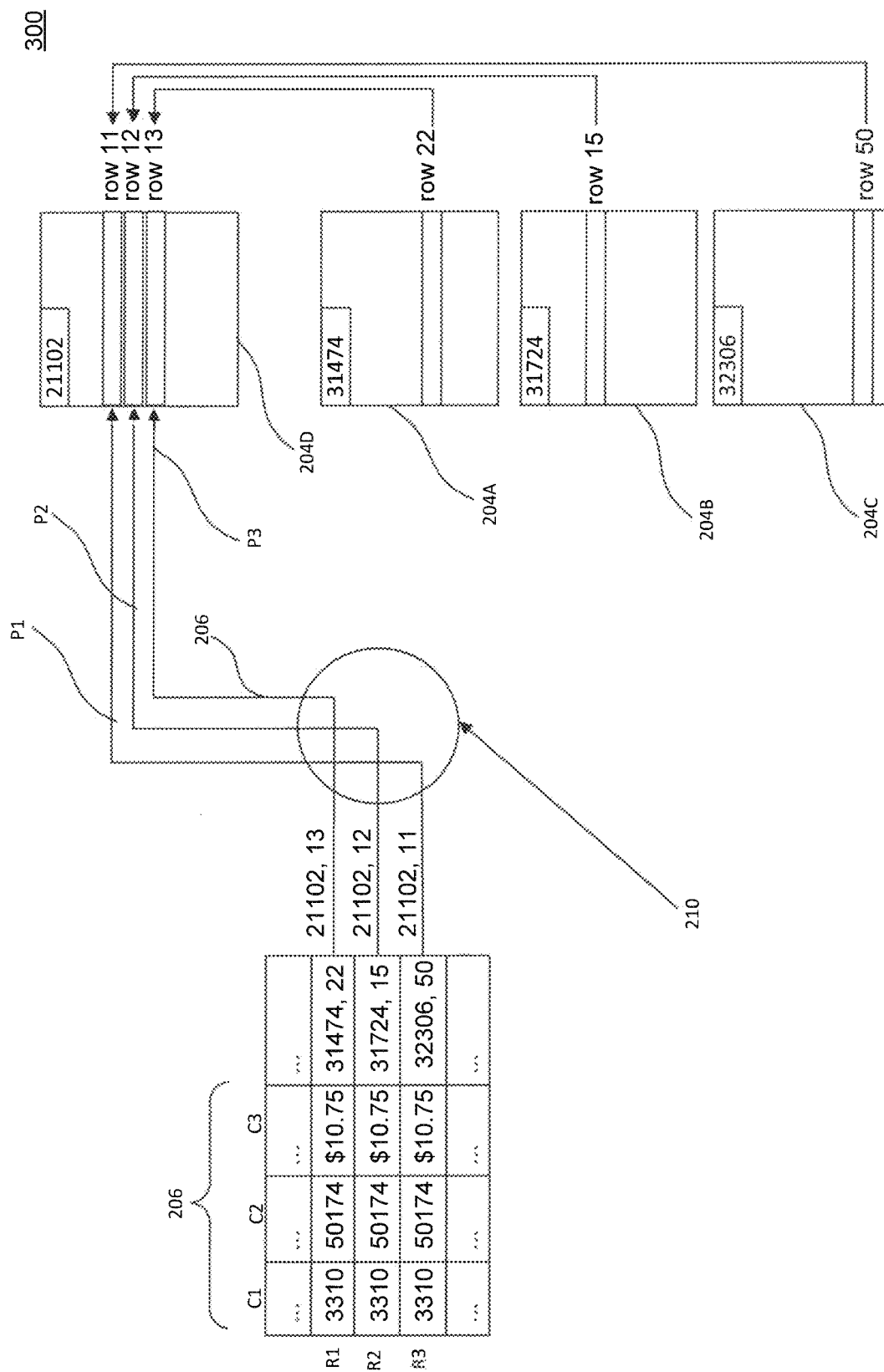
FIG. 3 is a block diagram of a corrupted indexed table to be repaired, according to an embodiment.

FIG. 3 is a block diagram 300 of a table having a corrupted index to be repaired, according to an embodiment. In block diagram 300, data in table 180 of block diagram 200 is reorganized and copied to a different physical page 204, as part, for example, of a database compaction operation. For example, data in rows R1, R2, and R3 was copied to a single page 204D having ID 21102 and in rows 11, 12 and 13. Because of the reorganization, index pointers 210 on the index keys K1, K2, and K3 have also been updated. However, the updated index pointers 210 are now out of order, as shown in FIG. 3. Particularly, index pointers 210 show that index pointers P1 and P3 are out of order, as index pointer P1 is now associated with row R3 and index pointer P3 is now associated with row R1. Because index pointers 210 in index 206 are not in the correct order, index 206 is a corrupted index and cannot be properly used to access data in table 180.

To maintain an ordered index, conventional database systems drop and recreate an index on the copied data. However, this procedure is processor and memory intensive. For instance, to recreate an ordered index data is again recopied more physical pages require allocation to store the data. Also the physical pages that store the copied data may not be immediately reallocated, and additionally, the data should be sorted which results in additional storage overhead and processor time. In database systems where storage space is expensive, such extra space may not be available to recreate the index.

To avoid index recreation, sorting module 170 determines whether index 206 can be sorted in-place. If so, sorting module 170 eliminates the expensive index sort described above.

To determine whether index 206 can be sorted in-place, sorting module 170 determines whether index keys that should be sorted are tail-end keys of the indexed rows in table 180. Sorting module 170 also determines whether the index keys are of fixed size.

In an embodiment, tail-end keys are keys on columns in table 180 set in a particular, sorted, order. For example, index 206 is built on columns C1, C2, and C3 in an order where index keys on column C1 are the major keys, index keys on column C2 are the first minor keys, and index keys on column C3 are the terminal keys or finals keys. In this case, index 206 should be sorted in order on columns C1, C2, and C3.

In an embodiment, an index key is of fixed size if it references a fixed memory space. For example, an index key that references a character string of fixed size, such as 4 bytes, or an integer is a fixed index key. An index key that references a character string of various lengths or a nullable number is not a fixed index key. A person skilled in the art will appreciate that a nullable number may be represented by the size of a number when the number exists or by zero bytes when the number does not exist.

For example, if index 206 is on columns C1, C2, and C3 where C1 is an integer, C2 is a character string of fixed size, and C3 is another integer, index 206 set on columns C1, C2, and C3 can be sorted in-place. However, if column C2 includes character strings of various sizes, such as character string having a size of one character for row R1 and size of one hundred characters for row R2, an index key is not a fixed index key. If an index key is not a fixed index key, sorting module 170 should not perform an in-place index sort because sorting module 170 may overwrite memory space during the in-place sort.

For illustrative purposes, index 206 on columns C1, C2, and C3 meets the criteria above and can be sorted in-place.

Once sorting module 170 determines that index 206 can be sorted in-place, sorting module 170 performs an in-place sort on index 206. In an embodiment, sorting module 170 uses one of the sorting algorithms known to a person of ordinary skill in the art to sort the index in-place. Example algorithms may be quicksort, bubble sort, merge sort, heap sort, etc.

Figure 4:
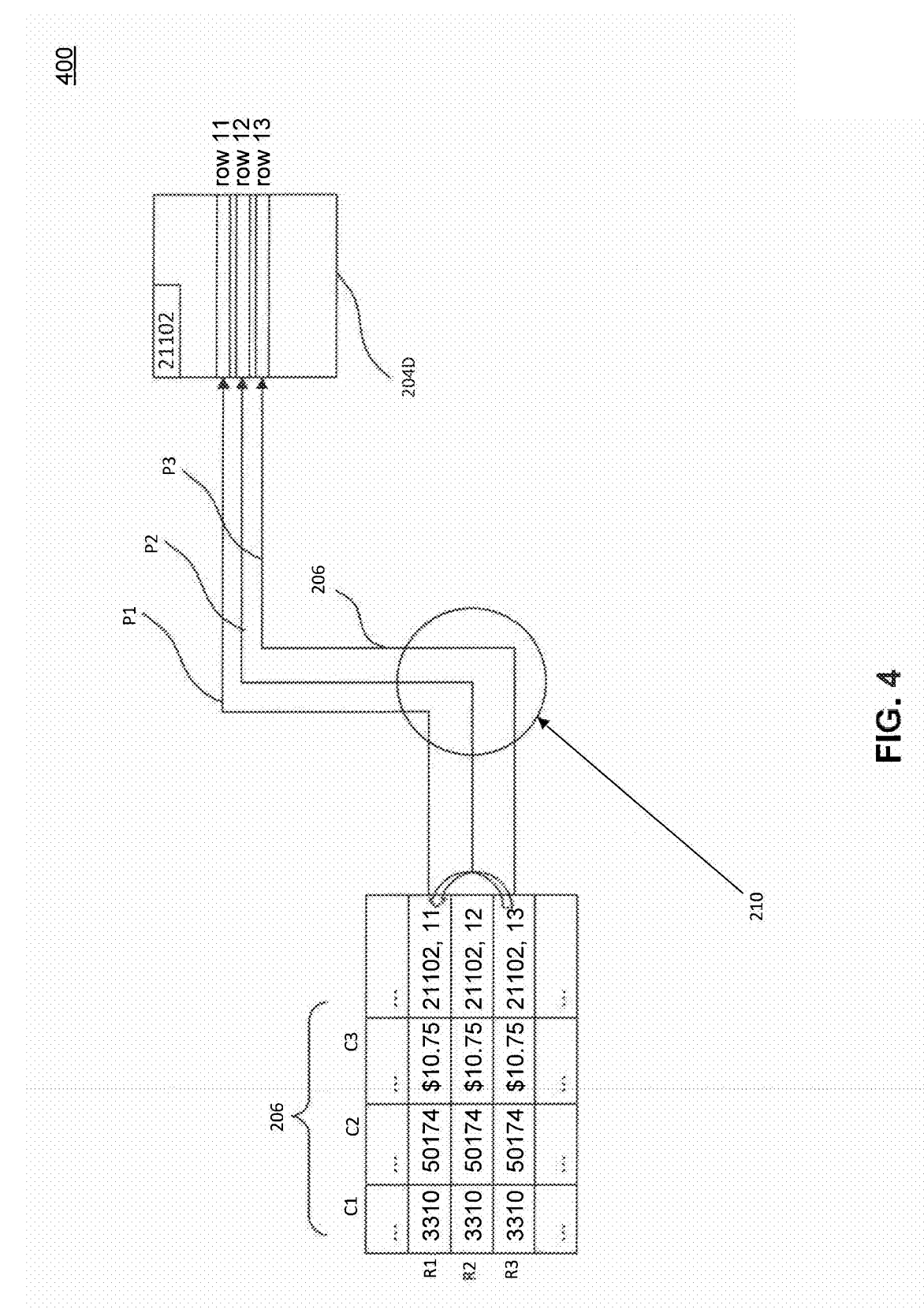
FIG. 4 is a block diagram of a repaired indexed table, according to an embodiment.

FIG. 4 is a block diagram 400 of a repaired indexed table after an in-place sort, according to an embodiment.

To perform an in-place sort on index 206, sorting module 170 identifies the duplicate rows in the indexed columns that are associated with corrupted index pointers 210. Once sorting module 170 identifies the duplicate rows in the indexed columns, such as rows R1 and R3, sorting module 170 then sorts the rows (e.g., R1 and R3) into a correct order. To sort rows R1 and R3, sorting module 170 moves data in row R3 into a temporary memory space in physical page 204. Sorting module 170 then overwrites row R3's memory space in physical page 204D with data from row R1, and then copies the data from row R3 stored in the temporary memory space into the R1's memory space in the physical page 204D. Because rows R1 and R3 are of the same length, the sorting does not disarrange other index keys in physical page 204.

In an embodiment, suppose column C1 is an integer column, column C2 is a four byte character column, and column C3 is another integer column, and an index is set on column C2. To sort the index set on column C2, sorting module 170 first identifies whether it can perform an in-pace sort on column C2. As discussed above, sorting module 170 determines whether the index on column C2 is a tail-end index, and whether index keys in columns C2 and C3 are of fixed size. Because both columns C2 and C3 are of fixed size (a fixed length character string and an integer), and index set on column C2 is the only index and thus is tail-end, sorting module 170 determines that it can perform an in-place sort on column C2. After the sort, index pointers P1 and P3 are associated with rows R1 and R3, instead of rows R3 and R1, respectively, as shown in FIG. 4.

Suppose, sorting module 170 determines that rows R1 and R3 in column C2 should be sorted. Sorting module 170 then copies data in row R1 from columns C2 and C3 into temporary memory space. After the data in row R1 is copied, sorting module 170 overwrites columns C2 and C3 of row R1 with data from row R3 in columns C2 and C3. Finally, sorting module 170 copies the data in row R1 from temporary memory space into columns C2 and C3 of row R3. After the copying, index pointers P1 and P3 associated with rows R1 and R3 are in sorted order.

Figure 5:
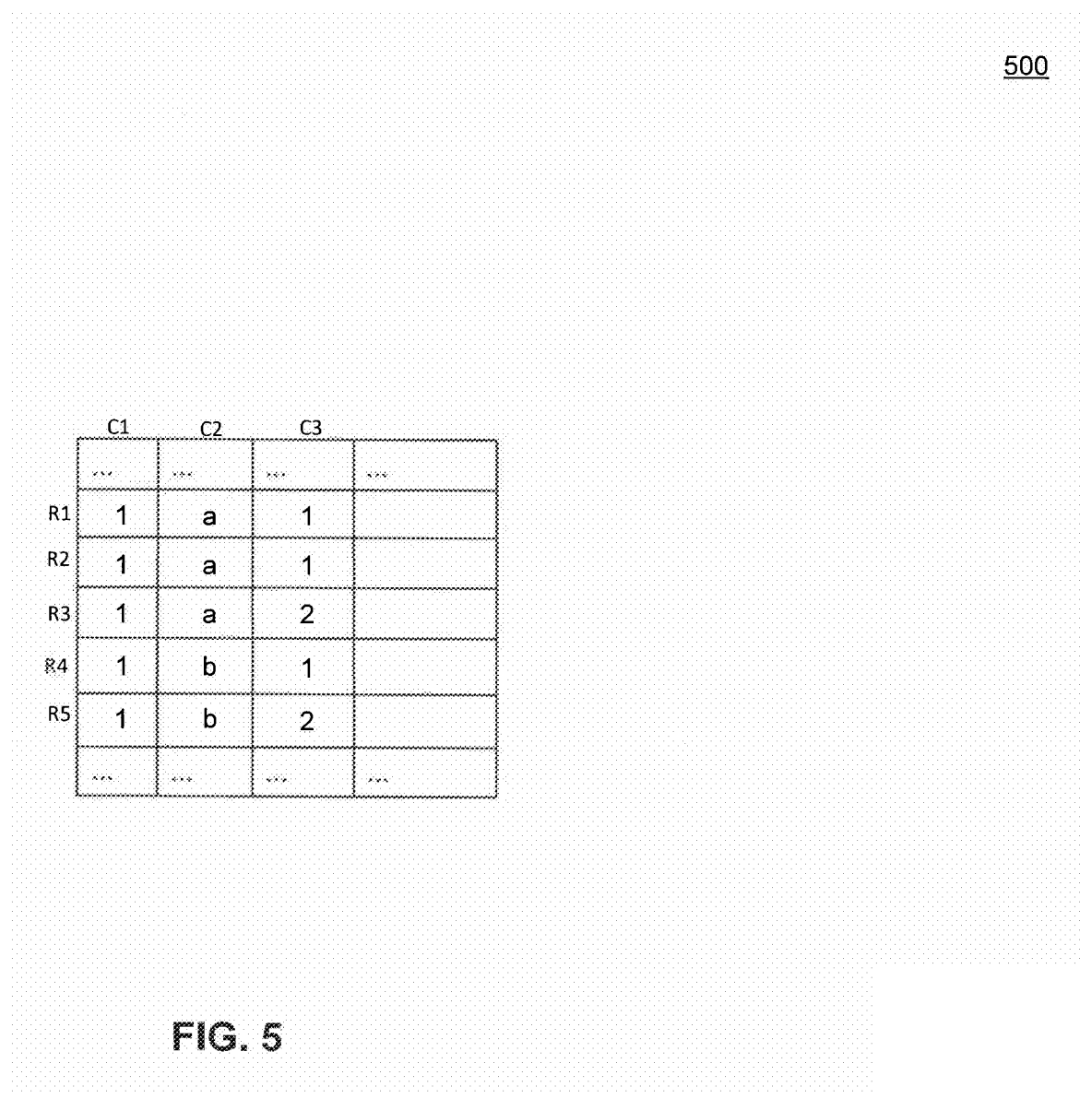

FIG. 5 is a block diagram 500 of an indexed table on which an in-place sort can be implemented, according to an embodiment. For purposes of block diagram 500, sorting module 170 can perform an in-place sort on table 180.

In block diagram 500, table 180 includes three columns C1 to C3 and five rows R1 to R5. In an embodiment, index 206 in block diagram 500 set is on columns C1, C2, and C3. To sort keys in column C2, sorting module 170 identifies a key range in a preceding column where values are the same, such as column C1. For example, values in rows R1-R5 in column C1 are equal to one. The values within the key range form a key group. Sorting module 170 then sorts index keys within the key group on column C2. In this case, sorting module 170 performs an in-place sort on rows R1-R3 and R4-R5 in column C2 as described in FIG. 4, above.

Once sorting module 170 completes an in-place sort on column C2, sorting module 170 then performs an in-place sort on column C3. For example, sorting module 170 identifies a key range in rows R1 and R2, and performs an in-place sort on rows R1 and R2.

In an embodiment, other operations on table 180 can result in a corrupt index. Example operation that creates a corrupt index includes changes in the sorting order of fixed data, such as changes that result from a case-sensitive to a case-blind sort in a fixed length character data. A person skilled in the art will appreciate that a case sensitive blind sort treats upper and lower case characters (such as "A" and "a") as having different values, while a case-blind sort treats the upper and lower characters as having the same value ("A"="a"). Another example operation that creates a corrupt index includes changing rows from an ascending to a descending sort order (or vice versa) within one or more indexed columns. The corrupt index resulting from these operations can also be fixed using an in-place index sort on the tail-end index key(s).

Figure 6:
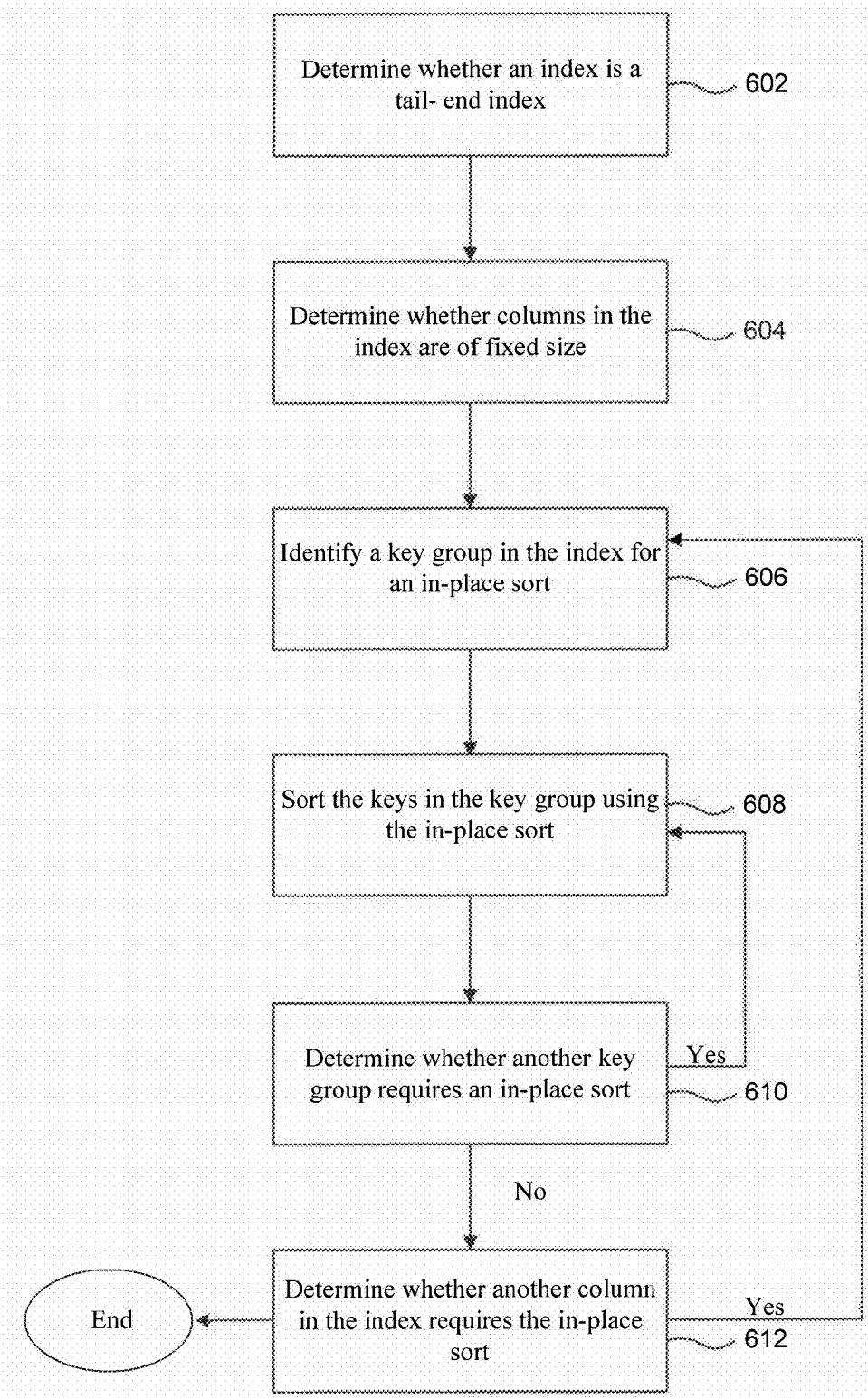
FIG. 6 is a flowchart of a method for repairing an indexed table, according to an embodiment.

FIG. 6 is a flowchart 600 of a method for repairing an indexed table, according to an embodiment.

At operation 602, a determination is made whether an index is a tail-end index. For example, sorting module 170 determines whether index 206 on table 180 is a tail-end index. If index 206 is not a tail-end index, the flowchart ends.

At operation 604, a determination is made whether columns in an index are of fixed size. For example, sorting module 170 determines whether columns of index 206 are of fixed size. If columns of index 206 are not of the fixed size, the flowchart ends.

At operation 606, a key group is identified. For example, sorting module 170 identifies a range of values in the left most column of index 206 that has not been sorted, where the values are the same.

At operation 608, rows corresponding to the values in the key group are sorted. For example, sorting module 170 performs an in-place sort on the rows in the key group. As discussed above, an in-place sort may be performed on two rows in the column to the right of the column based on which the key group was identified, if the rows should be sorted when data values are the same but index pointers 210 are scrambled. If sorting should be performed, sorting module 170 copies data in the entire first row beginning with the column to the right of the column based on which the key group is identified to a temporary memory space. Sorting module 170 then copies data in the second row into the memory space of the first row in table 180, and then copies the first row from the temporary memory space into the memory space of the second row in table 180. Operation 608 repeats until the index keys in the key group are sorted.

At operation 610, a determination is made whether another key group should be sorted. If another key group should be sorted, the flowchart proceeds to operation 608, otherwise to operation 612.

At operation 612, a determination is made whether another column in the index should be sorted. If another column should be sorted, the flowchart proceeds to operation 606, otherwise, the flowchart ends.

Figure 7:
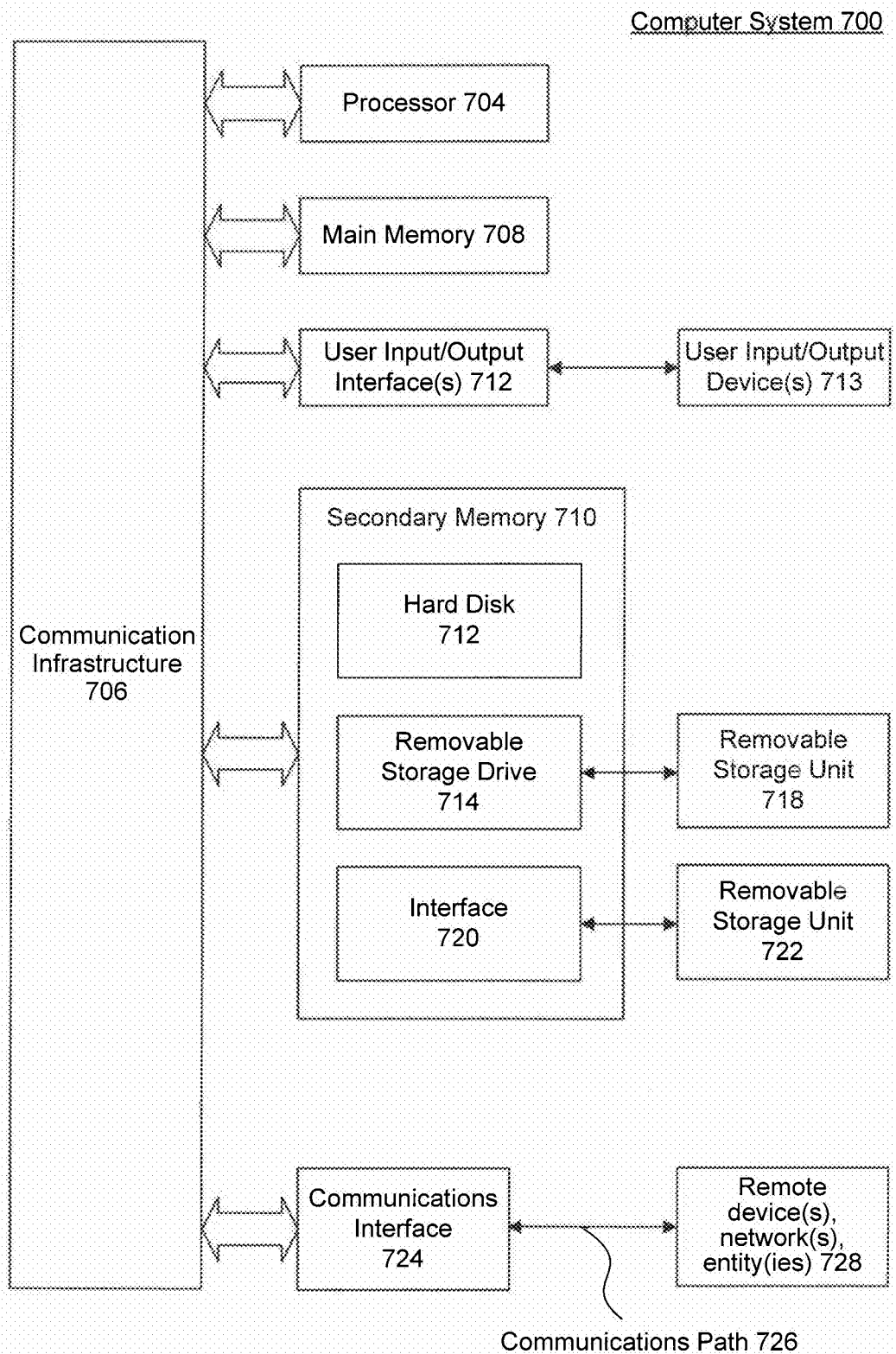
FIG. 7 is an example computer system useful for implementing various embodiments.

Various embodiments can be implemented, for example, using one or more well-known computer systems, such as computer system 700 shown in FIG. 7. Computer system 700 can be any well-known computer capable of performing the functions described herein, such as computers available from International Business Machines, Apple, Sun, HP, Dell, Sony, Toshiba, etc.

Computer system 700 includes one or more processors (also called central processing units, or CPUs), such as a processor 704. Processor 704 is connected to a communication infrastructure or bus 706.

One or more processors 704 may each be a graphics processing unit (GPU). In an embodiment, a GPU is a processor that is a specialized electronic circuit designed to rapidly process mathematically intensive applications on electronic devices. The GPU may have a highly parallel structure that is efficient for parallel processing of large blocks of data, such as mathematically intensive data common to computer graphics applications, images and videos.

Computer system 700 also includes user input/output device(s) 703, such as monitors, keyboards, pointing devices, etc., which communicate with communication infrastructure 706 through user input/output interface(s) 702.

Computer system 700 also includes a main or primary memory 708, such as random access memory (RAM). Main memory 708 may include one or more levels of cache. Main memory 708 has stored therein control logic (i.e., computer software) and/or data.

Computer system 700 may also include one or more secondary storage devices or memory 710. Secondary memory 710 may include, for example, a hard disk drive 712 and/or a removable storage device or drive 714. Removable storage drive 714 may be a floppy disk drive, a magnetic tape drive, a compact disk drive, an optical storage device, tape backup device, and/or any other storage device/drive.

Removable storage drive 714 may interact with a removable storage unit 718. Removable storage unit 718 includes a computer usable or readable storage device having stored thereon computer software (control logic) and/or data. Removable storage unit 718 may be a floppy disk, magnetic tape, compact disk, DVD, optical storage disk, and/any other computer data storage device. Removable storage drive 714 reads from and/or writes to removable storage unit 718 in a well-known manner.

According to an exemplary embodiment, secondary memory 710 may include other means, instrumentalities or other approaches for allowing computer programs and/or other instructions and/or data to be accessed by computer system 700. Such means, instrumentalities or other approaches may include, for example, a removable storage unit 722 and an interface 720. Examples of the removable storage unit 722 and the interface 720 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 700 may further include a communication or network interface 724. Communication interface 724 enables computer system 700 to communicate and interact with any combination of remote devices, remote networks, remote entities, etc. (individually and collectively referenced by reference number 728). For example, communication interface 724 may allow computer system 700 to communicate with remote devices 728 over communications path 726, which may be wired and/or wireless, and which may include any combination of LANs, WANs, the Internet, etc. Control logic and/or data may be transmitted to and from computer system 700 via communication path 726.

In an embodiment, a tangible apparatus or article of manufacture comprising a tangible computer useable or readable medium having control logic (software) stored thereon is also referred to herein as a computer program product or program storage device. This includes, but is not limited to, computer system 700, main memory 708, secondary memory 710, and removable storage units 718 and 722, as well as tangible articles of manufacture embodying any combination of the foregoing. Such control logic, when executed by one or more data processing devices (such as computer system 700), causes such data processing devices to operate as described herein.

Based on the teachings contained in this disclosure, it will be apparent to persons skilled in the relevant art(s) how to make and use the disclosure using data processing devices, computer systems and/or computer architectures other than that shown in FIG. 7. In particular, embodiments may operate with software, hardware, and/or operating system implementations other than those described herein.

CONCLUSION

It is to be appreciated that the Detailed Description section, and not the Summary and Abstract sections (if any), is intended to be used to interpret the claims. The Summary and Abstract sections (if any) may set forth one or more, but not all, contemplated exemplary embodiments, and thus are not intended to limit the disclosure or the appended claims in any way.

While the disclosure has been described herein with reference to exemplary embodiments for exemplary fields and applications, it should be understood that the disclosure is not limited thereto. Other embodiments and modifications thereto are possible, and are within the scope and spirit of the disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments may perform functional blocks, steps, operations, methods, etc. using orderings different than those described herein.

References herein to "one embodiment," "an embodiment," "an example embodiment," or similar phrases, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein.

The breadth and scope should not be limited by any of the above-described exemplary embodiments, but should be defined only in accordance with the following claims and their equivalents.

What is claimed is:

1. A method, comprising:
performing an operation on a database table comprising an index, wherein the index is set on at least one column having duplicate values, and wherein the operation scrambles index keys of the index that are set on the duplicate values of the at least one column out of order; and
reordering, using an in-place index sort, the index set on the at least one column in the database table, wherein reordering the index in-place unscrambles the index keys.

2. The method of claim 1, further comprising:
determining the index as a tail-end index, wherein the index is the tail-end index when the index is set in order on a first column and a second column of the at least one columns; and
wherein the reordering is based on the determining.

3. The method of claim 2, wherein performing the in-place index sort on the index further comprises:
performing the in-place index sort on the index wherein the first column and the second column are sorted in the order the index is set on the first column and the second column.

4. The method of claim 1, further comprising:
determining the index as a fixed-size index,
wherein the index is the fixed-size index when the at least one column includes rows of a fixed width; and
wherein the reordering is based on the determining.

5. The method of claim 1, further comprising:
determining a key group including a first column and a second column of the at least one column, wherein the first column is to the left of the second column, and wherein values in the first column in the key group are duplicates of each other; and
sorting, using the in-place index sort, index keys of the second column, wherein the index keys of the second column are associated with values that are duplicates of each other.

6. The method of claim 1, wherein performing the operation further comprises copying the database table from a first location to a second location as part of a database compaction operation that reorganizes physical memory space in a database system.

7. The method of claim 1, wherein performing the operation further comprises changing a sorting order of a fixed-length data in the database table.

8. The method of claim 1, wherein an index key of the index keys includes mapping of a logical memory location of a row in the at least one column to a physical memory location of the row in the at least one column.

9. A system, comprising:
a memory; and
at least one processor coupled to the memory and configured to:
perform an operation on a database table comprising an index, wherein the index is set on at least one column having duplicate values, and wherein the operation scrambles index keys of the index that are set on the duplicate values out of order; and
reorder, using an in-place index sort, the index set on the at least one column in the database table, wherein reordering the index in-place unscrambles the index keys.

10. The system of claim 9, further comprising:
determining the index as a tail-end index, wherein the index is the tail-end index when the index is set in order on a first column and a second column of the at least one columns; and
wherein the reordering is based on the determining.

11. The system of claim 10, wherein to perform the in-place index sort on the index the at least one processor is further configured to:
perform the in-place index sort on the index where the first column and the second column are sorted in the order the index is set on the first column and the second column.

12. The system of claim 9, further comprising:
determining the index as a fixed-size index wherein the index is the fixed-size index when the at least one column includes rows of a fixed width; and
wherein the reordering is based on the determining.

13. The system of claim 9, wherein the at least one processor is
further configured to:
determine a key group including a first column and a second column of the at least one column, wherein the first column is to the left of the second column, and wherein values in the first column in the key group are duplicates of each other; and
sort, using the in-place index sort, index keys of the second column, wherein the index keys of the second column are associated with values that are duplicates of each other.

14. The system of claim 9, wherein to perform the operation, the at least one processor is further configured to copy the database table from a first location to a second location as part of a database compaction operation that reorganizes physical memory space in a database system.

15. The system of claim 9, wherein an index key of the index keys includes mapping of a logical memory location of a row in the at least one column to a physical memory location of the row in the at least one column.

16. The system of claim 9, wherein to perform the operation the at least one processor is further configured to change the sorting order of fixed-length data.

17. A computer-readable device having instructions stored thereon that, when executed by at least one computing device, causes the at least one computing device to perform operations comprising:
performing an operation on a database table comprising an index, wherein the index is set on at least one column having duplicate values, and wherein the operation scrambles index keys of the index that are set on the duplicate values out of order; and reordering, using an in-place index sort, the index set on the at least one column in the database table, wherein reordering the index in place unscrambles the index keys.

18. The computer-readable device of claim 17, the operations further comprising:

determining the index as a tail-end index, wherein index is the tail-end index when the index is set in order on a first column and a second column of the at least one columns; and wherein the reordering is based on the determining.

19. The computer-readable device of claim 18, wherein to perform the in-place index sort on the index, the operations further comprise:

performing the in-place index sort on the index where the first column and the second column are sorted in the order the index is set on the first column and the second column.

20. The computer-readable device of claim 17, wherein the operations further comprise:

determining the index as a fixed-size index, wherein the index is the fixed-size index when the at least one column includes rows of a fixed width; and wherein the reordering is based on the determining.

* * * * *